United States Patent [19]

Blanpain et al.

[11] 4,048,705
[45] Sept. 20, 1977

[54] METHOD OF MAKING SOLDERING WIRE CONSTITUTED BY A CORE OF POWDER AND A METALLIC TUBE ENCLOSING THE CORE

[75] Inventors: Jacques Blanpain, Gentbrugge; Leon Delehouzee, Wondelgem, both of Belgium

[73] Assignee: Acieries Reunies de Burbach-Eich-Dudelange S.A. ARBED, Luxembourg, Luxembourg

[21] Appl. No.: 572,636

[22] Filed: Apr. 29, 1975

[30] Foreign Application Priority Data

May 22, 1974 France .................................. 74.17830

[51] Int. Cl.² .............................................. B22F 3/24
[52] U.S. Cl. ........................................ 29/420; 219/146; 219/145; 228/56; 53/36; 428/558
[58] Field of Search ................... 219/146, 145; 29/420, 29/420.5; 228/56

[56] References Cited

U.S. PATENT DOCUMENTS

| | | | |
|---|---|---|---|
| 1,265,453 | 5/1918 | Jones | 219/146 |
| 1,690,534 | 11/1928 | Erich | 219/146 |
| 1,995,584 | 3/1935 | Sarazin | 219/146 |
| 2,468,372 | 4/1949 | Landis | 219/146 |
| 2,909,778 | 10/1959 | Landis et al. | 219/146 |
| 3,059,331 | 10/1962 | Pflumm | 29/420.5 |
| 3,118,053 | 1/1964 | Arikawa et al. | 219/146 |
| 3,531,620 | 9/1970 | Arikawa et al. | 219/146 |
| 3,533,152 | 10/1970 | Gloor et al. | 29/420.5 |
| 3,543,381 | 12/1970 | Martin | 29/420.5 |

Primary Examiner—C.W. Lanham
Assistant Examiner—V. K. Rising
Attorney, Agent, or Firm—Michael J. Striker

[57] ABSTRACT

Soldering wire constituted by a core of powder and a metallic tube enclosing the core of powder is produced by substantially filling an elongated upwardly open metal channel with the powder and introducing a profiled band into the thus filled channel which overlaps the powder at the open end of the channel and which engages the inner faces of the channel to keep the powder, during closing of the channel by bending upper longitudinally extending edges thereof into abutment with each other and subsequently welding these edges to each other, away from the longitudinal edges.

12 Claims, 2 Drawing Figures

METHOD OF MAKING SOLDERING WIRE CONSTITUTED BY A CORE OF POWDER AND A METALLIC TUBE ENCLOSING THE CORE

BACKGROUND OF THE INVENTION

The present invention relates to a soldering wire, constituted by a core of powder and a tubular metallic member surrounding the core, to be used for automatic or semi-automatic soldering, with or without a protective gas, as well as to a method of manufacturing such a soldering wire.

It is known in the art to use a soldering wire or a wire for hard surfacing which is composed of an outer metallic sheath and a core of powder surrounded by this sheath. The cylindrical or polygonal sheath is usually formed from a band of steel, which may or may not be alloyed, or from another metal which contributes to the soldering. The core of the soldering wire, which constitutes usually 10 to 50% of the total weight of the wire is composed of a pulverulent mixture usually comprising a plurality of the following components in different combinations in accordance with the work to be performed and in accordance with the conditions prevailing during the soldering. Such components may include a slag forming material of an oxide base and/or carbonates of alkaline earth metal, a flux—forming material of fluoride base and/or alkaline halogenides or alkaline earth metal, deoxidizing and denitrating metals such as Al, Mg, Si, Ti, Mn and different alloys of such metal, one or a plurality of products for stabilization of the soldering arc, for example a titanium base of calcium or potassium, a support material of ferric base, of ferro alloys or other metals and alloys to form the desired soldering composition. Other mineral and metallic products may be included in the composition of the powder, but since the specific composition of the powder does not form part of the present invention, the above enumeration of such compositions is considered to be sufficient.

A process of fabricating such soldering wires with a core of powder is also known in the art which consists to transform a continuous metallic band into a channel, to introduce the pulverulent mixture in such a channel, to form the channel by one or a plurality of rolling operations or drawing operations by means of a drawing die into a tubular member enclosing the powder, and to close the metallic member by forming a weld seam connecting the longitudinal edges before proceeding with the final drawing operation to impart to the thus formed soldering wire the desired diameter.

This known process of fabrication has considerable drawbacks in that the powder tends to disperse and to stick to the bent borders of the channel during closure of the same and to stick especially to these borders during connecting the borders of the channel by soldering or welding. This will result in a joint of the borders by soldering or welding of such poor quality that the final transformation of the filled tube by drawing is rendered very difficult and the diameter of the thus-formed soldering wire can therefore be reduced by drawing only to a small extent.

Various solutions to overcome this drawback are known in the art. A first solution consists to reduce the amount of powder which is fed into the channel. This of course leads to a corresponding increase of the ratio of solid metal to the powder in the soldering wire thus obtained. Furthermore, this solution necessarily leads to difficulties in maintaining the homogeneity and uniform distribution of the powder during the fabrication and the transformation of the tubular wire. The possibility to use such a soldering wire having a disadvantageous ratio of powder to metal and an irregular quality and evidently very limited. Another solution, which likewise will only partially solve the above pointed out problem, consists to submit the powder distributed in the channel to an equalization and compacting prior to closing the tube blank. A further solution which entails a complication in the technique of preparing the powder and the introduction thereof into the channel consists to mix the powder with a binder and to extrude the thus formed plastic mass in form of a continuous, preformed strand into the channel. This last-mentioned solution is burdensome and does not lend itself to competitive mass fabrication. Thus, all of the above-mentioned solutions have not found an industrial application for manufacturing tubular soldering wires with a soldered or welded joint.

SUMMARY OF THE INVENTION

It is an object of the present invention to provide a soldering wire of the aforementioned kind and a method of manufacturing the same in which a tubular blank formed from a metallic band is filled with a substantial quantity of powder, and in which the edges of the tubular blank are united by soldering or welding, and in which a perfect weld seam is obtained so that the thus formed wire can be easily transformed to a wire of smaller diameter by a cold drawing operation.

With these and other objects in view, which will become apparent as the disclosure proceeds, the process according to the present invention of manufacturing a soldering wire constituted by a core of powder and a tubular metallic member surrounding the core, mainly comprises the steps of forming from a metal band an open channel of substantially U-shaped profile having a pair of lateral flanks with upper end edges extending longitudinally of the channel, introducing into the channel a stream of powder to substantially fill the channel with the powder, covering the powder introduced into the performed channel by a sheath which surrounds at least part of the powder and holds it at the bottom of the channel to keep it away from the end edges of the flanks, closing the channel by bringing the end edges in abutment with each other, and permanently connecting the end edges to each other.

According to a first form of carrying out the invention, the loose strand of powder after being placed into the channel is at least partly covered by an elongated leaf formed to touch the curved borders of the channel in engagement with the flanks thereof through a small distance downwardly of the upper surface of the strand of powder. The elongated leaf may form a fixed tongue having preferably a cross section of a circular arc and this tongue may provisionally enclose the powder in the region where the edges of the channel form a joint and extend up to a small distance downstream of the soldered or welded joint into the interior of the closed tube.

Preferably, this leaf is a continuous band which is unwound from a bobbin or reel at the same speed at which the band which forms the outer tube is withdrawn and the leaf which is preferably preformed is placed above the loose strand of powder. This leaf is preferably constituted by an electrically conductive metal and is included in the soldering wire and constitutes a very useful part thereof.

This covering leaf, whether constituted by a fixed tongue not integrated in the soldering wire, or constituted by a continuous band included in the soldering wire, prevents displacement of the powder and contact of the powder with the edges of the band to be soldered and forming the outer tube of the soldering wire. In addition it leaves a sufficient space beneath the joint formed by the bent borders of the channel to assure thus the presence of a gaseous protection indispensible for certain soldering processes.

The leaf is preferably constituted by a metal. The metal will present a rigidity and resistance against abrasion when it is used as material for a fixed tongue. The surface of such a fixed tongue will be smooth to prevent sticking of the powder thereto. When the leaf is integrated in the soldering wire, which is the preferred solution, it is generally formed by a thin ribbon of electrically conductive metal, such as alloyed or non-alloyed steel, another metal or alloy of support, or a metal completing or replacing a constituent of the outer metallic tube or of the powder filling the tube. On the other hand, it is also possible to use for this leaf, for special applications, a nonmetallic product such as, for example, a plastic or paper.

To avoid the risk that the leaf, during the closure of the channel will be lodged with portion thereof between the edges of the closed tube, an inwardly extending longitudinal groove is formed in a central portion of the leaf which is preferably prior thereto formed in a circular arc. The thus formed leaf will, therefore, have substantially a form similar to the letter M with the edges thereof rounded. This shape, in addition, advantageously forms, as will be explained later on, a useful conductive projection extending into the core of the strand of powder.

The leaf which is destined to be integrated in the soldering wire may also be provided with corrugations extending transverse to the longitudinal direction of the leaf. This will prove advantageous in the stretching of the soldering wire during a first wire drawing operation and it avoids the risk of rupture of the leaf, which could eventually lead to a displacement of the powder prior to complete compacting thereof in the interior of the tube.

According to another form of carrying out the invention, the powder is first formed in a continuous coherent strand or wire. Since the ratio of wire drawing of the soldered tube to be produced is very extensive, the diameter of its core wire may be held relatively large, for example in the order of 10 to 20 mm, which greatly facilitates its fabrication. In order to obtain such a filled core wire, it is possible to enclose the powder, plastified by means of a binder (for example, of silicate base) and formed by extrusion, by means of a skin of plastic material. On the other hand, it is possible to introduce the non-treated powder into a thin ribbon, of metallic or non-metallic material, which is closed, for example by cementing the longitudinal edges of the ribbon to each other, by fastening the edges by pinching and/or crushing the edges formed by marginal portions directed against the exterior of a U-shaped channel. This wire formed by the powder, which may be produced at a time prior to forming the complete soldering wire, is then introduced into the profiled channel forming the outer tube which is subsequently closed and soldered, which will prevent dispersion of the powder to the exterior of the outer tube, and the latter may then be subjected to a drawing operation to obtain the desired final diameter of the soldering wire.

Due to the above-mentioned steps, the weld seam on the outer tube will be of excellent quality and the filling of the outer tube with the powder will be very uniform so that the diameter of the soldering wire may be reduced below 1.6 mm and even below 1.0 mm by subsequent drawing operations so that the soldering wire may be used with very fine electrodes.

Furthermore, since the weld seam in the soldering wire will be without flaws, and since it is possible to increase the amount at which the channel is filled with the powder, since the powder will not contaminate the edges of the band from which the outer tubular member of the soldering wire is formed, it is possible to form the outer tubular member of the soldering wire thinner than was possible up to now and to establish in the soldering wire a ratio between the cross section of the powder core and the total cross section which is much greater than was possible to obtain up to now.

Furthermore, due to the fact that in accordance with the preferred form of execution a metallic fold will penetrate more or less into the center of the powder core, an efficient preheating of the powder will be produced during the fusion thereof by electrodes. Therefore, the powder and the alloy elements will melt more easily and uniformly and the speed of fusion of the thin envelope and the core will be identical, which permits to considerably increase the speed of a soldering operation. Up to now, such a configuration has not been obtainable except by complicated and cumbersome profiling of the outer envelope of the soldering wire, the borders of which have been bent in different ways toward the interior of the wire core, which usually did lead to a non-tight joint.

The soldering wire obtained with the process according to the present invention is of the closed type. It has therefore the advantage of being impermeable to humidity and it is also possible to use liquid lubricants during the wire drawing without the danger of contamination of the powder and forming hydrogen during the soldering operation. In addition, it is possible to wind up the soldering wire without the danger that the outer tubular member will open and powder will be lost.

Furthermore, the soldering wire according to the present invention may be subjected without risk to thermal treatments and different atmospheres. In addition, the soldering wire may be covered with an outer metallic skin by means of any process known for this purpose, especially by a process of electrolytic metallization. Of course, the soldering wire may also be used without such an outer covering.

The outer tubular member of the soldering wire may be constituted by ordinary steel, but it may likewise be constituted by a more or less alloyed steel. Thus, the metallic constituents which up to now have been integrated in the powder may be chosen, in increased quantities, as alloying constituents for the outer tubular member. According to an advantageous modification it is also possible to use as the outer tubular member a sheet coated on one or both surfaces thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
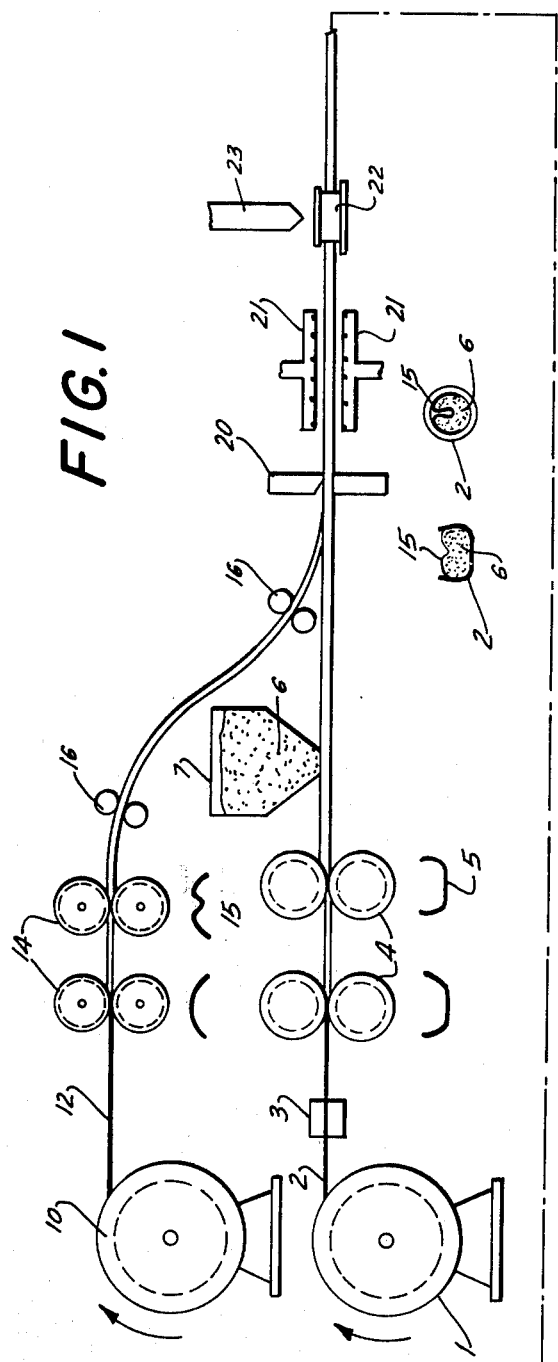
FIG. 1 schematically illustrates an arrangement for carrying out the manufacture of the soldering wire according to the present invention.

As shows in FIG. 1, a metallic strip 2 from which the outer tubular member of the soldering wire is to be formed is continuously withdrawn from a reel 1 under the influence of traction produced downstream of the reel. The band 2, the composition and dimension of which may be varied in accordance with the nature and the diameter of the soldering wire to be produced, may for example be a band formed of soft steel with a thickness of 1.2 mm and a width of 31.5 mm. In order to insure a continuous production at least one supplementary reel is provided, as well as an automatic installation for welding the end of the metallic band on one reel to the beginning of the metallic band on the supplementary reel.

The steel band is first passed through a lubricator 3 which provides a lubricating film on the band before it is guided into forming means in which it is formed in two successive steps into an elongated channel 5 of substantially U-shaped configuration by means of two sets of rollers 4 having horizontally extending axes and driven in synchronism with the speed at which the band is withdrawn from the reel 1 by the winding drum 26. The cross sections of the profiled band produced by the two sets of rollers are respectively shown beneath the respective roller sets.

Subsequently thereto, a loose strand of soldering powder 6 is placed at the bottom of the channel 5. The powder 6, which may include in accordance with the use of the soldering wire a mixture of various products of flux-forming material, slag-forming material, oxidizing agents, products emitting a gas, alloying additions, etc., are discharged from a reservoir 7, advantageously equipped with a vibrator or an endless feed screw (not shown) which will assure a continuous flow of the powder out of the longitudinal nozzle of the reservoir 7 and located above the channel 5.

The covering ribbon 12 not yet profiled, which in the present example may be constituted by a hand of soft steel of a thickness of 0.3 mm and a width of 20 mm, is unwound from a reel 10. The ribbon 12 is passed between two sets of driven rollers 14 having horizontal axes in which the ribbon is first formed to a cross section of a circular arc as shown beneath the first set of rollers and subsequently provided with a central longitudinally and inwardly extending groove as shown beneath the second set of rollers 14. This groove is more or less pronounced in accordance with the depth it should penetrate into the powder. The thus profiled ribbon is subsequently guided between sets of guide rollers 16 in order to be placed downstream of the reservoir 7 from which powder is discharged into the channel onto the powder in the channel 5 as shown in cross section beneath the junction of the ribbon 15 and the channel 5.

The assembly formed by the channel 5, the powder 6 therein and the covering leaf 15 is drawn across a special drawing die 20 which is in the form as disclosed in the French application filed with the Ser. No. 741781 on May 22, 1974 with the title "Drawing Die for Closing a Tube Blank." The drawing die disclosed in the aforementioned application comprises a conical inlet portion, the axis of which includes an angle of 10° to 20° with the horizontal axis of a cylindrical portion integrally joined to the small diameter of the conical portion. This specific drawing die as disclosed in the French application will not only assure proper abutment of the longitudinal edges of the channel against each other, but it will also assure that the tube emanating from the drawing die will not curve in longitudinal direction but will remain aligned along a horizontal axis. At the outlet end of the drawing die 20, the longitudinal edges of the outer metallic tube will be in contact with each other without overlapping and the powder 6 will be compacted beneath the covering sheet 15 as shown in cross section beneath and to the right of the die 20.

The thus performed tube of a diameter in the neighborhood of 12 mm is then passed through a burner 21 in which the surface of the tube is freed of any remainders of the lubricant used during forming thereof, and the joint is preheated for the following welding operation which can thus be carried out at increased speed. The welding of the longitudinal slit in the tube is carried out while the preformed tube is guided between two rollers 22 having vertical axes which maintain the longitudinal edges of the tubular sheet in contact with each other and in the desired position. The joining of these edges is carried out by the welder 23. The latter may be constituted by a resistance welder, by an induction welder, by an arc produced under an inert gas, an electron beam, a laser, or any other welder known in the art which will carry out the welding operation to obtain a perfect weld seam which is realizable by the above-described steps according to the present invention.

After leaving the welder 23 the thus closed tube is then passed through a lubricator 24 and subsequently thereto passed through at least one drawing die 25 in which the diameter of the tube is reduced to be subsequently wound about a winding drum 26 having a vertical axis and being rotated about this axis in the direction as indicated by the arrow by drive means not shown in the drawing. The soldering wire may extend only through one convolution about the winding drum 26 and be passed from the winding drum 26 through an additional lubricator 27 and through an additional drawing die 28 in which the diameter of the soldering wire is further reduced to be finally wound up on a winding drum 29 having likewise a vertical axis and being rotated about this axis by drive means not shown in the drawing.

The arrangement of winding drums having vertical axes has proven especially advantageous. In fact, since the tube extends in horizontal direction, no notable displacement of the powder in the interior of the tube is produced nor can there be formed a zone without power of heterogeneous zones in which the powder is unequally mixed, contrary to what can happen if the drawing is produced by winding drums having horizontal axes. The powder is thus compacted in good condition during reduction of the diameter of the tube to a degree which permits its transport and its final transformation without any risk to the powder core.

Finally, after the diameter of the tube is reduced by cold drawing to the desired diameter of the soldering wire, the latter may eventually be submitted to different treatments before its use.

Figure 2:
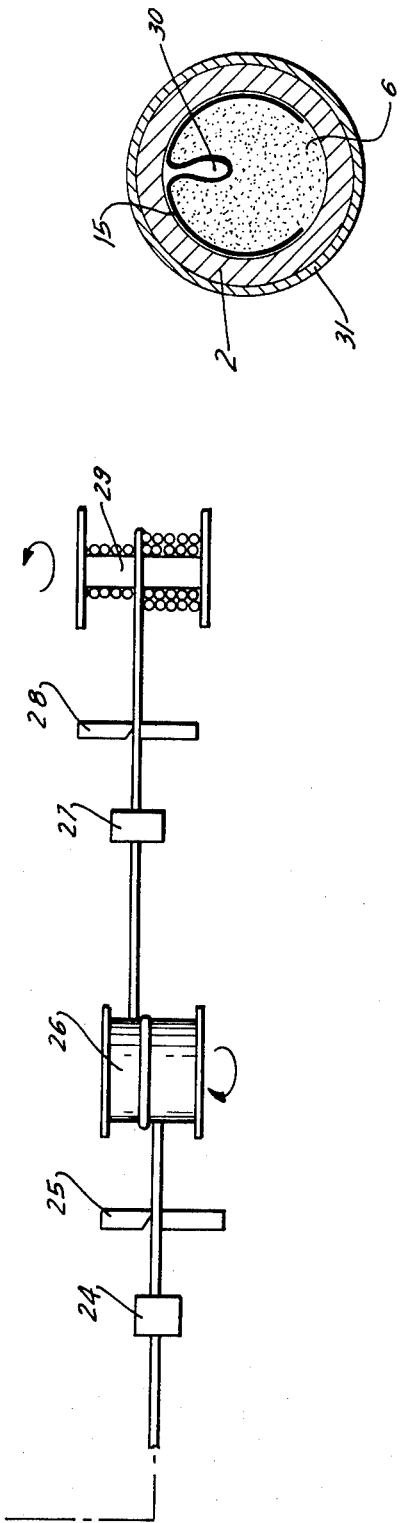
FIG. 2 is a transverse cross section of a preferred form of the soldering wire according to the present invention.

The soldering wire thus obtained comprises, as shown in the transverse cross section illustrated in FIG. 2, the covering band 15 in which the flanks of the groove formed therein are brought close to each other in form of a fold 30 which extends close to the center of the core of powder 6. The outer metallic tube 2 is covered with a metallic coating, for example of a coating of aluminum applied by dipping or by electrolysis. The coating may also be formed by Cu, Zn, Si, Mg, Mn, Ni and different alloys. Finally, the coating may be covered with a lubricant to reduce the resistance and friction of the wire during transport thereof through a soldering apparatus.

The closed tubular wire may be produced at unlimited length. The final diameter and the thickness of the outer wall may be determined in advance and may be chosen within a wide range and especially with regard to a very high ratio of the weight of the powder to the weight of the outer metallic tube and with a diameter of the soldering wire reduced down to 0.6 mm.

It will be understood that each of the elements described above, or two or more together, may also find a useful application in other types of soldering wires and method for manufacturing the same differing from the types described above.

While the invention has been illustrated and described as embodied in a soldering wire having a core of powder and an outer tubular metal member including the core, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process of manufacturing a soldering wire constituted by a core of soldering powder and a tubular metallic member enclosing the core, said process comprising the steps of forming from a metal band an open channel of substantially U-shaped profile having a pair of lateral flanks with upper end edges extending longitudinally of the channel; introducing into the channel a stream of soldering powder to substantially fill the channel with a loose strand of said powder; covering the loose strand of powder introduced into the preformed channel by a sheath which surrounds at least part of the powder and which abuts with curved borders thereof against inner faces of said flanks to hold the powder at the bottom of the channel and to keep it away from said end edges of said flanks; closing said channel by bringing said end edges in abutment with each other; and permanently connecting said end edges to each other.

2. A process as defined in claim 1, wherein said step of permanently connecting said end edges to each other comprises the step of welding said end edges to each other.

3. A process as defined in claim 2, and subjecting the thus formed assembly after the welding step to a drawing operation to reduce the cross-section of the assembly.

4. A process as defined in claim 1, wherein said sheath is preformed from an elongated foil and wherein the step of covering said strand of powder comprises the step of introducing the preformed elongated foil into the open channel so as to overlap the strand of powder and to abut with said curved borders thereof against the inner faces of said flanks.

5. A process as defined in claim 1, wherein said foil is preformed with a cross section of a circular arc and is introduced into the channel with the extremities of said arc-shaped foil extending downwardly.

6. A process as defined in claim 5, wherein said elongated foil is formed with a longitudinally and inwardly extending groove midway between the extremities of said arc-shaped foil.

7. A process as defined in claim 5, wherein said soldering wire is continuously produced by continuously withdrawing a metal band in horizontal direction and at a predetermined speed from a supply, by forming said band during movement thereof into said open channel, by passing said channel beneath a filling station at which powder is discharged into the open channel to form a continuous loose strand of powder in the moving channel, by simultaneously withdrawing at the same speed as said predetermined speed a band-shaped foil from a supply and imparting to said band-shaped foil during the movement thereof an arc-shaped cross section, by introducing said foil of arc-shaped cross section downstream of said filling station into said channel so that said arc-shaped foil overlaps said strand of powder and abuts with its curved borders against inner faces of the flanks of the channel, by subsequently passing the thus formed assembly through a closing die to close said channel with its longitudinal edges abutting against each other, and by passing the closed channels through a welding station at which the abutting edges of the channel are welded to each other.

8. A process as defined in claim 7, and including the step of subjecting the wire formed at the welding station, downstream of the latter to at least one drawing operation to reduce the cross section of said wire.

9. A process as defined in claim 8, wherein said foil is formed also with corrugations extending transverse to its length to permit an elongation of said foil during the drawing operation.

10. A process as defined in claim 1, wherein the powder is prior to its introduction into the channel formed into a continuous strand surrounded by a thin film.

11. A process as defined in claim 10, wherein said thin film is formed from metal.

12. A process as defined in claim 10, wherein said thin film is formed from non-metallic material.

* * * * *